(12) United States Patent
Trainor (10) Patent No.: US 11,724,832 B2
(45) Date of Patent: Aug. 15, 2023

(54) MAGNETIC SHIELD SYSTEM FOR SPACECRAFT

(71) Applicant: Eamonn Patrick Trainor, Latham, NY (US)

(72) Inventor: Eamonn Patrick Trainor, Latham, NY (US)

( * ) Notice: Subject to any disclaimer, the term of this patent is extended or adjusted under 35 U.S.C. 154(b) by 430 days.

(21) Appl. No.: 17/037,201

(22) Filed: Sep. 29, 2020

(65) Prior Publication Data
US 2022/0073218 A1    Mar. 10, 2022

Related U.S. Application Data

(60) Provisional application No. 63/075,247, filed on Sep. 7, 2020.

(51) Int. Cl.
   *B64G 1/54*    (2006.01)

(52) U.S. Cl.
   CPC .............. *B64G 1/543* (2013.01); *B64G 1/546* (2013.01)

(58) Field of Classification Search
   CPC ........... B64G 1/543; B64G 1/54; B64G 1/546
   See application file for complete search history.

(56) References Cited

U.S. PATENT DOCUMENTS

| | | | |
|---|---|---|---|
| 7,484,691 B2 | 2/2009 | Kinstler | |
| 8,575,580 B1 * | 11/2013 | Kinstler | B64G 1/54 250/517.1 |
| 8,809,824 B1 * | 8/2014 | Kinstler | B64G 1/54 244/171.1 |
| 10,011,372 B2 * | 7/2018 | Dong | B64G 1/543 |
| 10,633,121 B2 * | 4/2020 | Trainor | B64G 1/543 |
| 11,136,147 B2 * | 10/2021 | Russell | B64G 1/54 |
| 11,299,297 B1 * | 4/2022 | Trainor | B64G 1/543 |
| 11,453,515 B2 * | 9/2022 | Henson | B64G 1/543 |
| 2017/0121038 A1 * | 5/2017 | Dong | B64G 1/12 |
| 2018/0370660 A1 * | 12/2018 | Trainor | B64G 99/00 |
| 2020/0094995 A1 * | 3/2020 | Russell | B64G 1/222 |
| 2022/0204189 A1 * | 6/2022 | Jawad | B64G 1/543 |

\* cited by examiner

*Primary Examiner* — Philip J Bonzell (57) ABSTRACT

A system to create a magnetic field around the outside of a spacecraft to afford human occupants and electronic equipment with protection from cosmic and solar radiation. Using electromagnets to generate magnetic fields placed on the outer surface of the spacecraft, cosmic and solar radiation may be deflected from entering the main body of the spacecraft. In addition, the magnetic field lines are kept away from the human occupants and interior electronic equipment. Side electromagnets are placed on the side outer surface of the spacecraft and separate electromagnetics are positioned in a cross shaped configuration at the front and rear of the spacecraft in alignment with the side electromagnets. Magnetic field lines are channeled around the outside of the spacecraft or centered on the center of quadrupole magnets placed either at the front of rear of the spacecraft.

16 Claims, 5 Drawing Sheets

MAGNETIC SHIELD SYSTEM FOR SPACECRAFT

CROSS-REFERENCE TO RELATED APPLICATIONS

This application claims the benefit of provisional patent application Ser. No. 63/075,247, filed Sep. 7, 2020 by the present inventor.

BACKGROUND

Our planet, Earth, provides a natural magnetic field via a churning (most probably), molten iron core. This has enabled non-aqueous, non-subterranean organic life to live on the surface and thrive, protected from the deleterious effects of solar and cosmic radiation reaching the ground. Earth's magnetic field repels most cosmic and solar radiation from reaching the ground and thereby preventing damage to organic life living on the surface, such as breaking up DNA or destroying organic cells. Earth's magnetic field lines have no palpable effect (other than on compasses) on electronics, such as are found on airplanes or on the ground, because Earth's field lines are so far away from the Earth's surface due to the size of the Earth compared to the human scale and also due to the relative weakness of those magnetic field lines.

However, humans venturing out beyond low Earth orbit or through the Van Allen belts (areas of charged particles and ions trapped within Earth's magnetic field) are subjected to both solar and cosmic radiation. The exposure of the human body to this radiation is detrimental to long term health and could probably prove fatal either in the short or long term. The Apollo astronauts only went on 12-day journeys and were fortunate not to have been traveling during a solar storm or flare outburst, otherwise very high doses of radiation would have immersed the Apollo spacecraft. We need a way of protecting longer stay astronauts as they venture beyond low Earth orbit and outside of Earth's protective magnetic field.

There is a long felt but unresolved need for a way to protect human travelers venturing beyond the protective influence of Earth's magnetic field, where they will be exposed to the unfiltered cosmic and solar radiation on an ongoing basis. Otherwise, human crews will start to suffer adverse and, most probably, irreversible health consequences that may become a danger to the space mission even during the space mission and will have lifelong ill-effects on the people akin to radiation sickness, leukemia and shortened life span. Crew affected by radiation over-exposure during a space mission might not be able to maintain function of their spacecraft or will be too debilitated by the time they reach their destination. A way of counteracting this potentially space travel inhibiting scenario is now needed, especially since many space industry companies aim to venture out of low Earth orbit for considerable periods of time.

SUMMARY

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The present invention generally relates to a way to provide a structured, contained, adjustable, practical and effective way to create a uniform magnetic field surrounding the exterior sections of a spacecraft that will protect the human habitation/sensitive electronics section or the entire spacecraft from solar and cosmic radiation.

The best solution to providing protection against this solar and cosmic radiation is to use magnetic fields such as we have with Earth's magnetic field. Magnetic field lines are capable of deflecting and redirecting the charged particles and ions that are components of solar and cosmic radiation. However, magnetic fields interfere with electronics if they come close enough to the electronics. For instance, you should not put a magnet on or near your computer processor. Of course, spacecraft are full of sensitive electronic equipment. In addition, sustained duration magnetic fields are not good for the human body and any such necessary exposure, such as in MM machines, is kept to the minimum amount required.

Magnetic fields cause charged particles to change their direction of motion. Such particles will spiral, in a helical fashion, around magnetic field lines and will follow those field lines. Energetic electrons and protons will follow magnetic field lines rather than cross them. Also, if field strength increases in the direction of motion, the field will exert a force to slow the charges. Cosmic rays will also follow spiral/helical paths when encountering a magnetic field.

Magnetic fields do not have to be all that strong. Earth's magnetic field is weak, but it works. Earth's magnetic field is only 0.25 to 0.65 Gauss (or 25,000 to 65,000 nano-Teslas) strong. A strong refrigerator magnet can produce 100 Gauss or 0.001 Teslas. Therefore, regular electromagnets are sufficient to produce a strong enough magnetic field to trap charged particles, which trapped charged particles will in turn help impede cosmic rays, such as gamma rays. The depth of magnetic field lines does not need to be great, so long as the field lines are sufficiently strong. This means that nuclear power is not needed as a power source for spacecraft electromagnets to produce a magnetic field of sufficient strength, as the field does not have to be that strong. In addition, the electromagnets do not have to be of the super-conducting type, with all the super cooling and size of apparatus problems that brings. Field strengths as obtained from super-conducting magnets are not needed. Toroid shaped magnets (basically a solenoid bent into a circle) have been mooted but they create field lines that will travel through the central hole of the toroid (a toroid being donut shaped) and hence will cause the field lines to travel through the main body of the spacecraft, which is not desirable for the human occupants or electronics. Hence, the present invention utilizes gaps between the magnets to not only avoid an enhanced toroid effect, but also due to design considerations.

Radar and communications can go through magnetic fields, which allows spacecraft communications and navigation to be unimpeded by the presence of a magnetic field around the outside of the spacecraft. By limiting the magnetic field lines to the outer surface of the spacecraft, such lines are kept away from the people inside the spacecraft and from the electronics also inside the spacecraft. These are both desirable aims.

Thus, the present invention enables a system with magnetic field lines around the living quarters of a spacecraft, or any areas inhabited by people, and which may also contain sensitive electronic equipment. Long, thin electromagnets, are positioned around the outer surface of the spacecraft, for instance, at each point of the compass around the outer surface of the spacecraft (for example, 4 electromagnet configuration). The longer an electromagnet is, the stronger the magnetic field created hence such design is the preferential one to maximize field strength. In addition, the longer the electromagnets, the flatter will be the field lines created by those electromagnets and this is desirable for channeling the field lines and to avoid them trying to invade the human habitation section or main body of the spacecraft along which they are placed on the outer surface. The electromagnets are placed near the surface of the outer shell of the spacecraft, each parallel with the other. These electromagnets can run along substantially the length of the side of the spacecraft to provide maximum length field lines. These side electromagnets are equidistantly spaced apart. The electromagnets would have the appearance of ridges along the skin of the spacecraft. Quadrupole magnets configuration or alternatively two right angled electromagnets at 180° to each other are positioned at the front and rear of the spacecraft and may be independently powered, so that the strength of those magnets can be different to the lateral or side magnets. All electromagnets are able to be incrementally adjusted in power. There is a gap between the side positioned electromagnets and the front and rear positioned electromagnets.

One aspect of the present disclosure is directed to a system for creating a magnetic field around a spacecraft, comprising: including electromagnets, positioned on the outer surface of a spacecraft, wherein the electromagnets are powered by and can be switched on or off through a powered electricity supply connected to the electromagnets; wherein the electromagnets are positioned at equidistant points on the outer surface of the spacecraft; wherein quadrupole electromagnets are positioned at the center of the front and rear of the spacecraft and are separated by a physical gap from the electromagnets on the side of the spacecraft. In one embodiment, the side electromagnets can be projected out from or retracted into the body of the spacecraft. In another embodiment, the control of electricity to power the electromagnets is adjusted by use of a graduated power switch or device that allows the electrical power to the electromagnets to be gradually increased or decreased. In one embodiment, the outer surface or shell of the spacecraft has a composition or composite composition of materials, such as mu-metals or stainless steel, that will channel magnetic field lines along the outer surface of shell of the spacecraft. In another embodiment, the quadrupole magnets can be placed on the lid of a docking hatch or cover of the spacecraft, so that the docking hatch or cover can be opened and closed. In one embodiment, the side electromagnets run along the length of the living quarters/compartments.

Another aspect of the present disclosure is directed to a system for creating a magnetic field around a spacecraft, comprising: including electromagnets, positioned on the outer surface of a spacecraft, wherein the electromagnets are powered by and can be switched on or off through a powered electricity supply connected to the electromagnets; wherein the electromagnets are positioned at equidistant positions on the outer surface of the spacecraft; wherein right angled electromagnets are positioned at 180° to each other, opposite poles being 180° apart, at the center of the front and rear of the spacecraft and are separated by a physical gap from the electromagnets on the side of the spacecraft.

Another aspect of the present disclosure is directed to a system for creating a magnetic field around a spacecraft, comprising: including electromagnets, positioned on the outer surface of a spacecraft, wherein the electromagnets are powered by and can be switched on or off through a powered electricity supply connected to the electromagnets; wherein the electromagnets are positioned at equidistant positions on the outer surface of the spacecraft; wherein wherein right angled electromagnets are positioned at 180° to each other, opposite poles being 180° apart, at the center of the front of the spacecraft and quadrupole magnets are positioned at the center of the rear of the space craft, or these positions can be reversed, and are separated by a physical gap from the electromagnets on the side of the spacecraft, and the electromagnets positioned along the side surface of the spacecraft.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

REFERENCE NUMERALS

11 Spacecraft
12 Electromagnet (showing N=North magnetic pole, S=South magnetic pole)
13 Cover to a docking hatch for the spacecraft
14 Front of spacecraft 15 Side of spacecraft
16 Rear of spacecraft

DETAILED DESCRIPTION

The present invention generally relates to providing a magnetic shield around a spacecraft to deflect cosmic and solar radiation away from the spacecraft and thereby protect the human occupants of the spacecraft from radiation exposure.

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
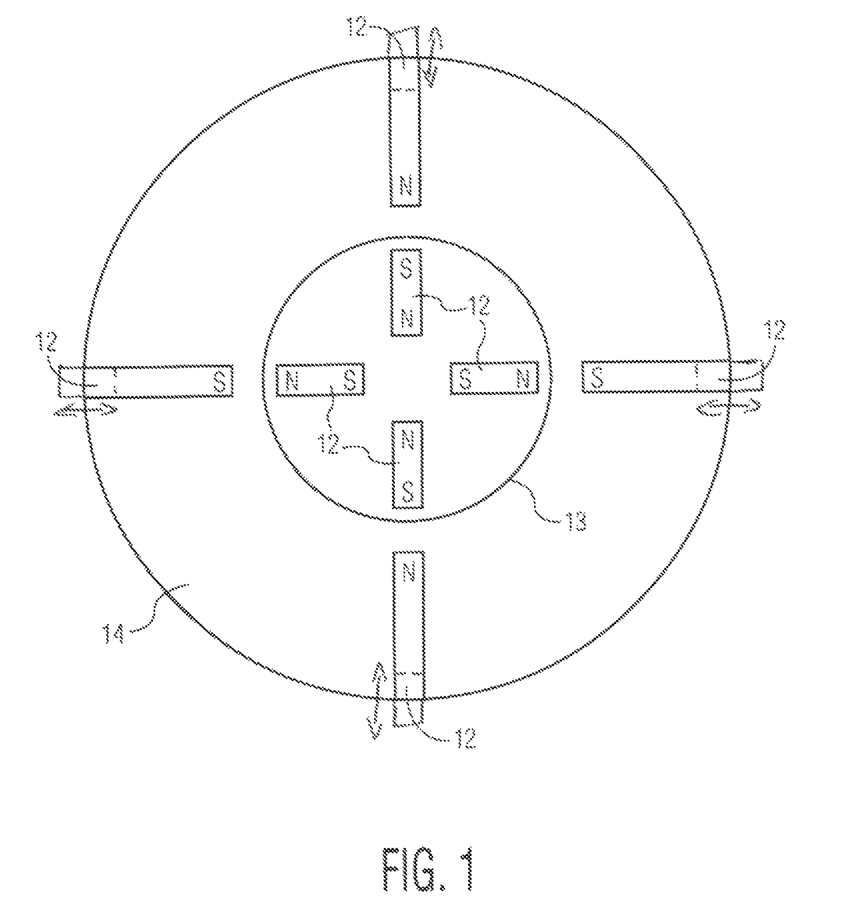
FIG. 1 is a perspective front view of a spacecraft. This view shows a circular enclosed section in the middle of the front that simulates the cover for the docking hatch for the spacecraft. This circular enclosed section has quadrupole magnets (four electromagnets) in a cross shaped configuration with polarities being opposite polarities of the aligned side/sideral electromagnets. Short gaps exist for the center docking hatch cover to be to be opened for docking. Side electromagnets running along the outer surface of the spacecraft are also visible.

Referring to FIG. 1, shows a front view perspective 14 of the spacecraft 11 with quadrupole electromagnets 12 placed at the front 14 of the spacecraft 11, to continue the field lines of the side placed electromagnets 12, to avoid breakage or stoppage to those field lines and which field lines will be channeled and will continue to direct charged particles along those field lines and channel them into the center of the quadrupole electromagnetic configuration. This will prevent the field lines creating magnetic poles at the front or back of the spacecraft and therefore preventing the magnetic field lines from seeking to return to the opposite pole via the shortest route, through the body of the spacecraft. Instead, the filed lines will converge in the center of the quadrupole electromagnet configuration. In addition, gaps between the magnets will prevent an electromagnetic toroid effect which would channel the field lines through the center of such a ring-shaped magnet and through the main body of the spacecraft. The outer surface of the spacecraft can also be composed of mu-metals, stainless steel or similar metals, composite or otherwise, which will help channel the magnetic field lines along the surface of the spacecraft rather than enter the body of the spacecraft.

Figure 2:
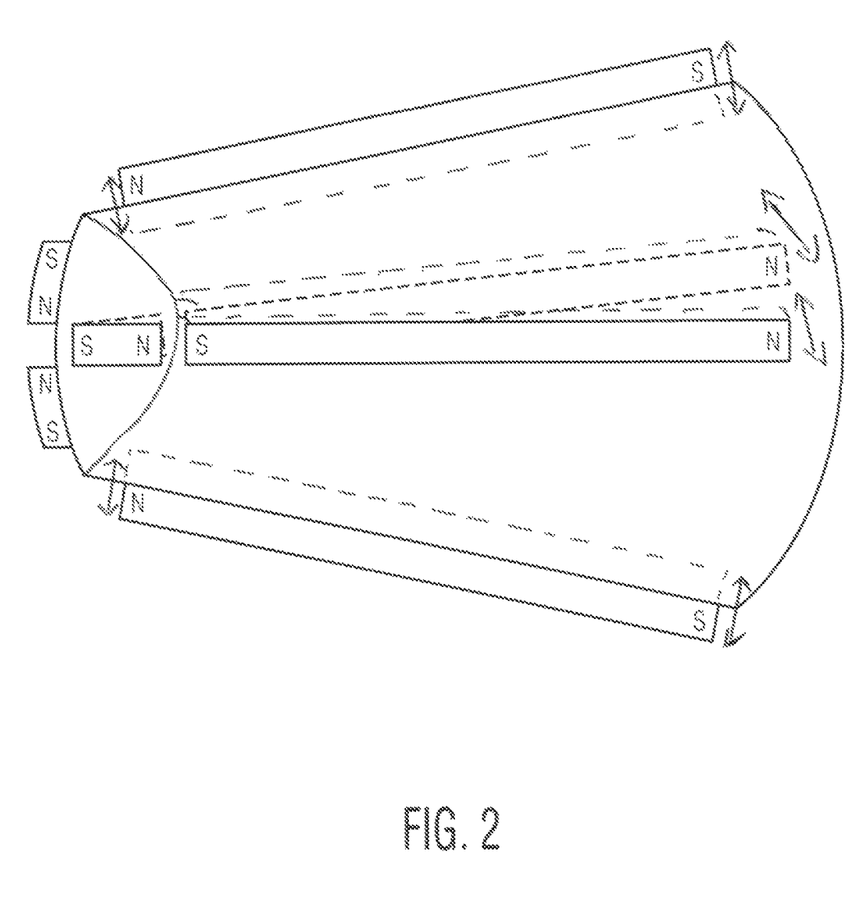
FIG. 2 is a perspective side view of a spacecraft showing long electromagnets running most of the exterior length of the spacecraft with short gaps near the front to allow the opening of a cover to a docking hatch for the spacecraft.

Referring to FIG. 2, a side perspective view is shown of a spacecraft 11 which shows the arrangement of electromagnets 12 along the side 15 of the spacecraft. Polarity of the magnets is shown however each instance of polarity can be reversed in any configuration.

In one embodiment, the system includes four or more electromagnets (in one instance placed at points equidistantly north, south, east, west of the body of the spacecraft) that are long, and spring loaded or electro-mechanically operated to jut out from spacecraft when required. Once a spacecraft has reached the vacuum of space, the electromagnets can be simply sprung loaded or otherwise electro-mechanically commanded to project or pivot out from the main body of the spacecraft through the outer shell of the spacecraft. Until then they can be enclosed within the body of the spacecraft with cover doors that can spring open when a signal is given to them. The electromagnets will not project far from body of spacecraft, will be just above the outer surface or line of the spacecraft and will follow the curvature or line of the spacecraft closely, along most of the length of the living/working quarters. Also, by having the electromagnets close to the outer shell of the spacecraft you can prevent the possibility of a protruding portion of the spacecraft colliding with any other structure during a docking sequence of maneuvers. The electromagnets are just inside the shell of the spacecraft for launch through an atmosphere but when a vacuum is reached an activation switch to open side vents/doors is triggered and the electromagnets are sprung out or pivoted out using a spring-loaded ejection mechanism or some other electromechanical can be used. In one embodiment, for simplicity of design, the electromagnets are in tension with compressed springs. In another aspect, the electromagnets may also be retracted back into the main body of the spacecraft, for when the spacecraft returns through an atmosphere for landing. This will prevent damage to the electromagnets from accumulated atmospheric friction and heat build-up and protect the spacecraft overall. It may be also necessary to retract the electromagnets when docking with another structure.

Use of long, thin electromagnets will increase the strength of the field created, as does increasing the electrical charge to the electromagnet. In practice the electromagnets will be just small ridges along the outer shell, so they will be unobtrusive. The electricity is then sent to the electromagnets and the strength of electric current sent to them is on an adjustable slider dial/switch. In other words, a dimmer switch to increase or decrease voltage and therefore increase or decrease magnetic field strength gradually. For instance, an increase in electric current will be needed to increase the magnetic field strength of the electromagnets when solar flares occur, which will give off greatly increased solar radiation pressure. This will be necessary to protect the astronauts and, also, very importantly the electronic equipment used to control the spacecraft. In addition, as explained further on, the gradual reduction of magnetic field strength will enable the dissipation of trapped charged particles away from the spacecraft or space station. In addition, electric current can be gradually decreased when seeking to get rid of trapped charged particles within the magnetic field lines.

In one embodiment, the system includes magnetic fields created by electromagnets that will stop most solar and cosmic radiation. However, about 1% of cosmic radiation (gamma rays, x-rays and neutrinos) are not stopped by magnetic fields. However, it has been shown that cosmic radiation, such as gamma rays, will interact with trapped charged particles, for instance from trapped solar radiation, that are already caught in the magnetic fields around the spacecraft. A magnetic field around a spacecraft will trap charged particles from the Sun and will create mini-Van Allen belts. This will copy the behavior of the Van Allen belts which are formed in Earth's magnetic field. The Van Allen belts are areas of trapped, charged particles at locations around within Earth's magnetic field. These mini-Van Allen belt type accumulation of trapped charged particles in the magnetic fields around a spacecraft will also help stop a lot of cosmic gamma radiation. Ultra-violet radiation can be stopped by other means e.g. synthetic fabrics lining built into the shell of a spacecraft or various painted applied blocking elements.

It will be necessary to get rid of the otherwise trapped charged particles caught in these mini-Van Allen belts, as these charged particles remain a danger to human occupants and the electronic equipment. To enable the charged particles to escape into paths that will take them on trajectories away from the spacecraft, the equivalent of a dimmer switch is used to control a graduated amount of electricity going to the electromagnets to slowly reduce the strength of the created magnetic fields. This will create a condition that will allow the trapped particles to eventually find a trajectory for escape into free space. The charged particles are still deterred from crossing the remaining magnetic field lines, but they will find an escape route with any trajectory outwards away from the magnetic field lines and into space away from the spacecraft. In addition, the electricity to power the electromagnets can also be gradually increased as needed, for instance in solar flare occurrences.

There is a physical gap between the side electromagnets and the cross shaped quadrupole configuration of electromagnets at the front and back of the spacecraft. This avoids a toroid effect (of channeling field lines through the center of the spacecraft as discussed earlier) and allows for easy the opening of docking hatches etc.

Figure 3:
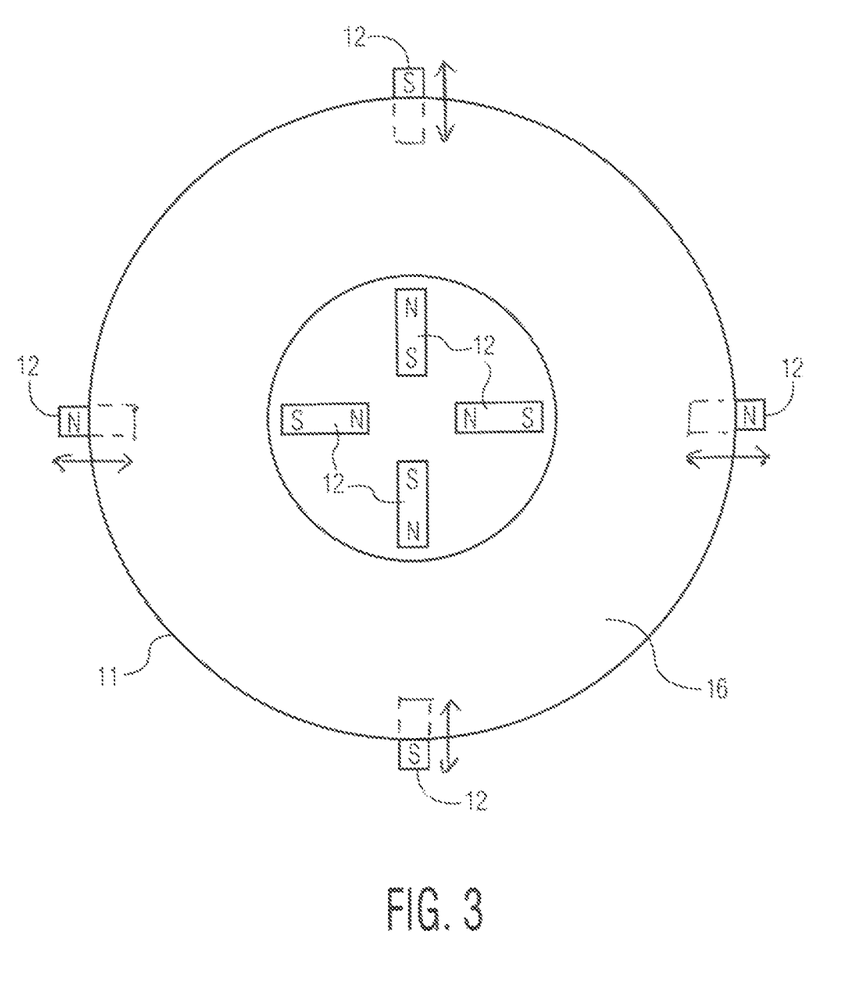
FIG. 3 is a perspective rear view of a spacecraft showing centrally placed quadrupole magnets (four electromagnets) in a cross shaped configuration with polarities being opposite polarities of the aligned side/sideral electromagnets. Side electromagnets running along the outer surface of the spacecraft are also visible.

Referring to FIG. 3, shows a rear-view perspective of the spacecraft 11 with quadrupole electromagnets 12 in a cross shaped configuration at the center of the rear 16 of the spacecraft 11. Polarities of the electromagnets are shown however these polarities can be reversed in each instance in any configuration. Magnetic shield protection at the rear will be needed, for instance, when the capsule is detached from the rest of the complete spacecraft. As already stated, each electromagnet positioned at the front, along the side or sides and rear of the spacecraft, should have its north/south poles aligned to allow a continuous line around the spacecraft. In other words, a south pole should always face a north pole and a north pole should always face a south pole. This arrangement necessitates a side positioned electromagnet to be on the same geometrical alignment with a corresponding opposite pole of one of the quadrupole magnets placed at the rear and front of the spacecraft. This will allow field lines to be channeled to the center of the quadrupole electromagnet configuration where the field lines will stop and any potential charged particles will be trapped there before they are released back into space by slow reduction of the power of the magnetic field either just at the back of the spacecraft or at all outer points of the spacecraft.

Figure 4:
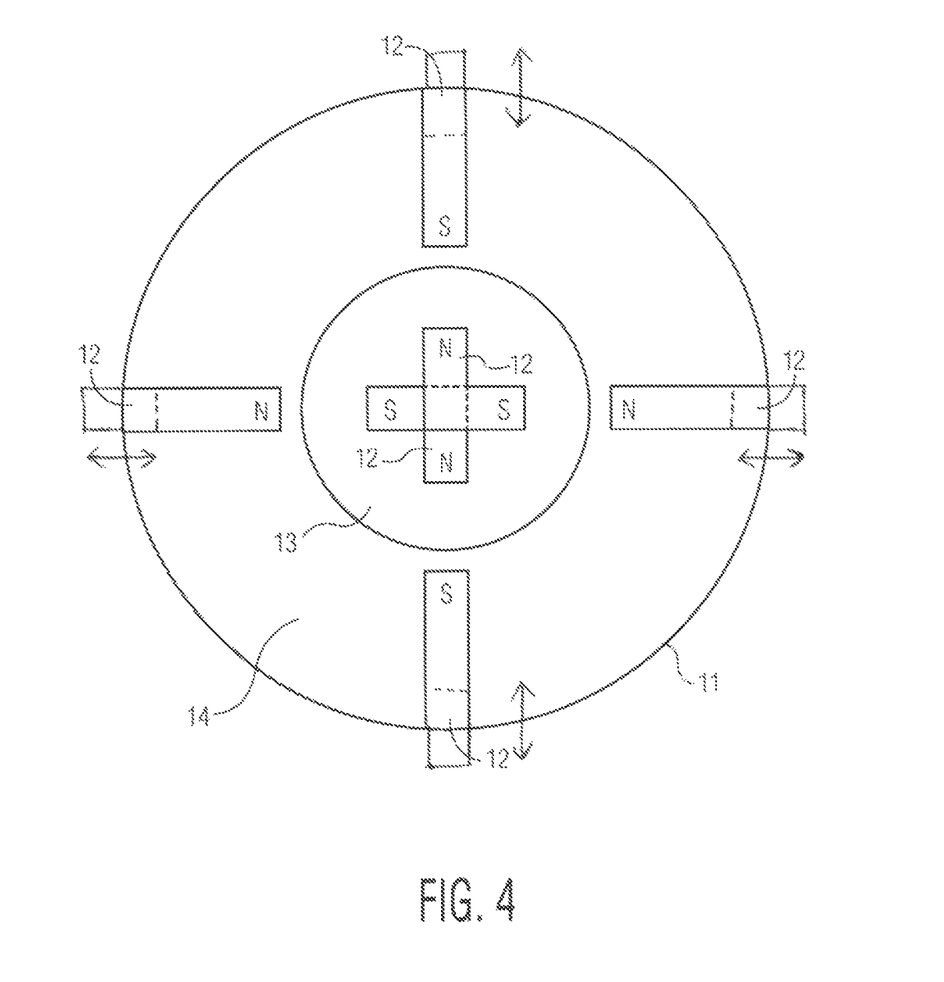
FIG. 4 is a perspective front view of a spacecraft. This view shows a circular enclosed section in the middle of the front that simulates the cover for the docking hatch for the spacecraft. This circular enclosed section has two right-angled electromagnets positioned at 180° to each other in a cross shaped configuration with polarities being aligned to opposite polarities of the aligned side/sideral electromagnets. Short gaps exist for the center docking hatch cover to be to be opened for docking. Side electromagnets running along the outer surface of the spacecraft are also visible.

Referring to FIG. 4, is a front perspective view 14 of a spacecraft 11 showing electromagnets 12 with poles of the electromagnets being indicated. Right angled electromagnets are placed at placed at 180° to each other to form the equivalent of a four-pronged electromagnet in a cross shaped configuration are shown at the center of the front 14 of the spacecraft. In this instance, the cross shaped configuration is seen placed on the cover of a docking hatch cover 13. There is a break in the continuous line of the side electromagnets to allow for the docking hatch cover to be opened and closed, for instance via a hinged mechanism and to avoid a toroid effect.

These right angled electromagnets placed at 180° to each other in a cross shaped configuration at the front and back of the spacecraft, will continue the field lines of the side placed electromagnets, to avoid the breakage or stoppage to those field lines and which field lines will be channeled and will continue to direct charged particles along those field lines, across the front of the spacecraft and channel them back along the sides of the spacecraft and eventually to the rear of the spacecraft. The field lines will continuously orbit around the spacecraft channeled by the side electromagnets and front and rear right angled magnets.

The field lines will travel to the back of the spacecraft in a continuous line. When the field lines reach the rear of the spacecraft they will continue their path through opposing poles on right angled electromagnets placed at 180° to each other to form a cross shaped configuration at the rear of the spacecraft aligned with the direction of the field lines coming towards the rear and this returns those field lines to the nearest opposite pole on the outside of the spacecraft. A north pole from a side electromagnet will face a south pole in the right-angled electromagnet cross shaped configuration and vice versa. This will cause any field lines to continue along the outside of the spacecraft rather than try to return through the body of the spacecraft, such as happens when you create a magnetic pole. The north/south poles of the cross shaped magnets at the front and the rear of spacecraft are positioned to allow the continuance of the field lines from the side electromagnets to pass across the front of the spacecraft and pass across the rear of the spacecraft and continue in motion around the outside of the spacecraft. The outer surface of the spacecraft can also be composed of mu-metals, stainless steel or similar metals, composite or otherwise, which will help channel the magnetic field lines along the surface of the spacecraft rather than enter the body of the spacecraft. Once again, by gradual reduction of power to the electromagnets, any trapped charged particles can find escape trajectories away from the body of the spacecraft.

Physical gaps or spaces between the electromagnets will also prevent creating a toroid effect of an unbroken electromagnet forming a complete, unbroken circle, in other words a donut shape. This will avoid magnetic field lines being channeled through the center of the donut shaped electromagnet and thus such field lines traveling through the center of the donut which would otherwise be the main body of the spacecraft.

Figure 5:
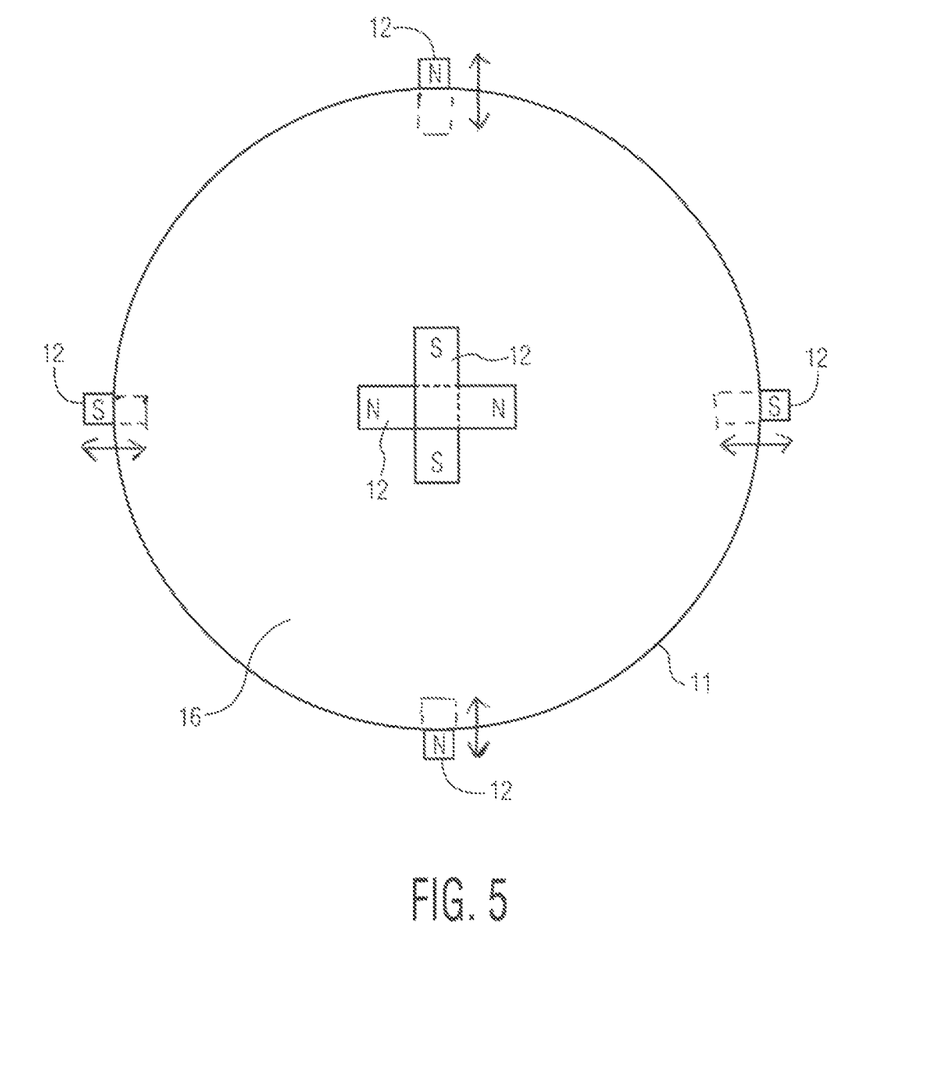
FIG. 5 is a perspective rear view of a spacecraft showing two centrally placed right-angled electromagnets positioned at 180° to each other in a cross shaped configuration with polarities being opposite polarities of the aligned side/sideral electromagnets. Side electromagnets running along the outer surface of the spacecraft are also visible.

Referring to FIG. 5 right angled shaped electromagnets 12, each positioned at 180° degrees to each other, are positioned at the rear 16 of the spacecraft 11. This is to allow field lines to be channeled around the rear of the spacecraft from one side electromagnets towards the other corresponding side electromagnets. Trapped charged particles will continue to orbit around the spacecraft via the orbiting magnetic field lines until they are released back into space by slow reduction of the power of the magnetic field at all outer points of the spacecraft.

Another aspect of the present disclosure is directed to a system for creating a magnetic field around a spacecraft, wherein right-angled electromagnets, positioned at 180° to each other, can be positioned at the front of the spacecraft and a quadrupole electromagnet configuration can be placed at the rear of the spacecraft, or these positions can be reversed. In each instance, the electromagnets at the front and rear of the spacecraft are separated by a physical gap from the electromagnets positioned along the side surface of the spacecraft.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions.

Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

The invention claimed is:

1. A system for creating a magnetic field around a spacecraft, comprising:
   electromagnets, positioned on an outer surface of the spacecraft, wherein the electromagnets are powered by and are configured to be switched on or off through a powered electricity supply connected to the electromagnets;
   wherein the electromagnets are positioned at equidistant positions on the outer surface of the spacecraft;
   wherein quadrupole electromagnets are configured to be placed at the center of a front of the spacecraft on the lid of a docking hatch or cover of the spacecraft and a rear of the spacecraft and are separated by a physical gap from the electromagnets on a side of the spacecraft.

2. The system of claim 1, wherein the side electromagnets are configured to be projected out from or retracted into the body of the spacecraft.

3. The system of claim 1, wherein the control of electricity to power the electromagnets is adjusted by use of a graduated power switch or device that allows the electrical power to the electromagnets to be gradually increased or decreased.

4. The system of claim 1, wherein the outer surface of the spacecraft has a composition or composite composition of materials, that will channel magnetic field lines along the outer surface of the spacecraft.

5. The system of claim 1, wherein the side electromagnets run along the length of a living quarters/compartments.

6. A system for creating a magnetic field around a spacecraft, comprising:
   electromagnets, positioned on an outer surface of the spacecraft, wherein the electromagnets are powered by and are configured to be switched on or off through a powered electricity supply connected to the electromagnets;
   wherein the electromagnets are positioned at equidistant positions on the outer surface of the spacecraft;
   wherein right angled electromagnets are positioned at 180° to each other, opposite poles being 180° apart, at the center of a front and rear of the spacecraft and are separated by a physical gap from the electromagnets on the side of the spacecraft.

7. The system of claim 6, wherein the side electromagnets are configured to be projected out from or retracted into the body of the spacecraft.

8. The system of claim 6, wherein the control of electricity to power the electromagnets is adjusted by use of a graduated power switch or device that allows the electrical power to the electromagnets to be gradually increased or decreased.

9. The system of claim 6, wherein the outer surface or shell of the spacecraft has a composition or composite composition of materials, that will channel magnetic field lines along the outer surface of shell of the spacecraft.

10. The system of claim 6, wherein the right angled electromagnets are configured to be placed on the lid of a docking hatch or cover of the spacecraft, so that the docking hatch or cover is configured to be opened and closed.

11. The system of claim 6, wherein the side electromagnets run along the length of a living quarters/compartments.

12. A system for creating a magnetic field around a spacecraft, comprising: including electromagnets, positioned on the outer surface of the spacecraft, wherein the electromagnets are powered by and are configured to be switched on or off through a powered electricity supply connected to the electromagnets; wherein the electromagnets are positioned at equidistant points on the outer surface of the spacecraft;
   where right angled electromagnets are positioned at 180° to each other, opposite poles being 180° apart, at the center of a front of the spacecraft and quadrupole magnets are positioned at the center of a rear of the space craft, or these positions can be reversed, and are separated by a physical gap from the electromagnets on the side of the spacecraft, and the electromagnets positioned along the side surface of the spacecraft.

13. The system of claim 12, wherein the side electromagnets are configured to be projected out from or retracted into the body of the spacecraft.

14. The system of claim 12, wherein the control of electricity to power the electromagnets is adjusted by use of a graduated power switch or device that allows the electrical power to the electromagnets to be gradually increased or decreased.

15. The system of claim 12, wherein the outer surface or shell of the spacecraft has a composition or composite composition of materials, that will channel magnetic field lines along the outer surface of shell of the spacecraft.

16. The system of claim 12, wherein the right angled electromagnets are configured to be placed on the lid of a docking hatch or cover of the spacecraft, so that the docking hatch or cover is configured to be opened and closed.

* * * * *